April 7, 1925.
1,532,795
F. BALCH
FLUORESCENT SCREEN AND METHOD OF MAKING SAME
Filed Dec. 26, 1922
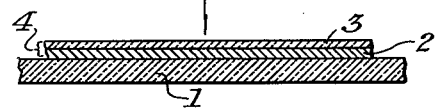
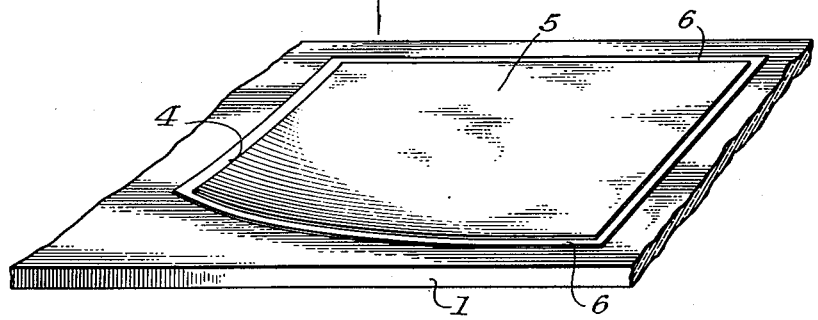
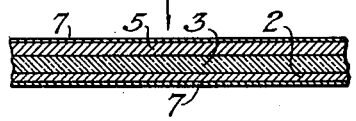
INVENTOR
Frank Balch,
BY R. L. Stinchfield
N. M. Perrins
ATTORNEYS.

Patented Apr. 7, 1925.

1,532,795

UNITED STATES PATENT OFFICE.

FRANK BALCH, OF SALEM, MASSACHUSETTS.

FLUORESCENT SCREEN AND METHOD OF MAKING SAME.

Application filed December 26, 1922. Serial No. 609,081.

*To all whom it may concern:*

Be it known that I, FRANK BALCH, a citizen of the United States of America, residing at Salem, in the county of Essex and State of Massachusetts, have invented certain new and useful Improvements in Fluorescent Screens and Methods of Making Same, of which the following is a full, clear, and exact specification.

This invention relates to fluorescent screens used to intensify the image produced on a sensitive plate or film by X-rays and to methods for making the same.

Among the objects of this invention are the production of a screen of high intensifying value and which is not fragile, and the attainment of simple and reliable methods of manufacture of such a screen. Other objects will appear hereinafter.

The active layer of a fluorescent screen generally consists of fine particles of fluorescent material, usually a salt in crystalline form, held in suspension in a binding material. There must be present enough of the binding material to form a coherent layer, and this layer must be of uniform composition and free from spots, blisters and other mechanical imperfections. For the highest efficiency of the screen the proportion of fluorescent material should be as great as possible.

I have discovered that, if there be used as a binding material a cellulose ester in a solution free from low boiling solvents, the resultant film is notably free from blemishes, is coherent and easily stripped and it is possible to use an extremely small proportion of binder and still obtain a layer that is sufficiently rugged for practical purposes.

Reference will now be made to the accompanying drawing in which the same reference characters designate the same parts throughout:

Fig. 1 is an enlarged fragmentary section of the film screen on the supporting table;

Fig. 2 is a perspective view of a complete screen being stripped from the table;

Fig. 3 is an enlarged fragmentary section of a finished screen;

In manufacturing a preferred form of my improved screen, I form an emulsion or mixture in accordance with the following formula:

|  | Ounces. |
|---|---|
| Calcium tungstate | 192 |
| Cellulose nitrate | 6 |
| Amyl acetate | 80 |
| Castor oil | 2 |

This is poured at room temperature over a polished glass table 1, and forms a layer 2 which dries slowly by the partial evaporation of the high boiling solvent, forming a smooth film, which while coherent is rather fragile for constant or rough usage. I form a backing or supporting layer 3 by pouring over this film a composition of the following formula:

|  | Ounces. |
|---|---|
| Cellulose nitrate | 12 |
| Amyl acetate | 56 |
| Castor oil | 0.5 |

In each of the above formulæ the cellulose nitrate used is one that is completely soluble in amyl acetate, and the castor oil acts as a softener.

The second layer dries slowly by the partial evaporation of the high boiling solvent forming a smooth film. I find that it is desirable that this second solution also shall contain only materials having a high boiling point and that if a low boiling solvent is used it has a tendency to attack and weaken the active layer. While the high boiling solvent acts to form a firm union with the film first laid down it does not injure it, and the resulting compound film 4 is free from blemishes.

It is sometimes desirable to attach to a film screen 4 made as described a further back or support and I use preferably a piece of cardboard 5 glued to the film screen 4 just described. This may be attached before or after stripping the film screen 4 from the glass plate 1, but I prefer to do so before stripping. Pieces of card board are cut to the desired dimensions and the screen material on the glass plate is cut to sizes slightly larger than the pieces of card board. A piece of card board 5 is then glued to the corresponding film screen section, being located so as to leave a narrow margin 6 of the film screen around the card board. A very wide range of equivalents is possible in the adhesive composition used and the following is given as a typical satisfactory formula:

Liquid fish glue_____ 1 quart
Thick syrup of sugar_____ 1 pint
Glycerine_____ 1 ounce When the glue is set the complete screen is stripped from the support. By reason of the margin 6 of highly flexible cellulosic material, it is possible to start the stripping readily and the card board is sufficiently flexible to permit easy stripping after the process is thus started. The screens may then be trimmed to the exact final size desired, and if desired may be varnished as by brushing with a waterproof or protective composition 7, such as, for instance, any well known pyroxylin varnish.

While I have herein fully described a preferred embodiment it is to be understood that I contemplate as within my invention such modifications and equivalents as fall within the terms of the appended claims. For instance, if as a binder cellulose acetate is used I find that a mixture of acetylene tetrachloride and methyl salicylate may be used as the solvent material therefor, both of these being high boilers.

I have found that satisfactory results are obtained if the film containing the fluorescent salt has a thickness of about .015 inches and the second or supporting film has a thickness of about .035 inches. I do not, however, limit myself to these dimensions which are given only by way of example. The thickness of the card board is quite immaterial.

By the use only of solvents having a high boiling point, I am enabled to use as low a proportion of cellulose nitrate to calcium tungstate as 1 or 2 per cent and in any event less than 5 per cent. In the example disclosed the proportion is substantially 3 per cent.

Having thus described my invention, what I claim as new and desire to secure by Letters Patent is:

1. The method of making a fluorescent screen that comprises the mixing of fluorescent material with a binding composition, the binding composition comprising a cellulose ester in solution and being free from materials having a low boiling point, and forming a film of such mixture.

2. The method of making a fluorescent screen that comprises the mixing of fluorescent material with a binding composition, the binding composition comprising cellulose nitrate in solution and being free from materials having a low boiling point, and forming a film of such mixture.

3. The method of making a fluorescent screen that comprises the mixing of fluorescent material with a binding composition, the binding composition comprising cellulose nitrate dissolved in amyl acetate and being free from materials having a low boiling point, and forming a film of such mixture.

4. The method of making a fluorescent screen that comprises the mixing of fluorescent material with a binding composition, the binding composition comprising a cellulose ester in solution and being free from materials having a low boiling point, forming from such mixture a film on a supporting surface and flowing over such film while on the supporting surface a composition comprising a cellulose ester in solution, thereby forming a second film layer adherent to the first.

5. The method of making a fluorescent screen that comprises the mixing of fluorescent material with a binding composition, the binding composition comprising a cellulose ester in solution and being free from materials having a low boiling point, forming from such mixture a film on a supporting surface and flowing over such film a composition comprising a cellulose ester in solution and free from materials having a low boiling point, thereby forming a second film layer adherent to the first.

6. The method of making a fluorescent screen that comprises the mixing of fluorescent material with a binding composition, the binding composition comprising cellulose nitrate in solution and being free from materials having a low boiling point, forming from such mixture a film on a supporting surface and flowing over such film a composition comprising cellulose nitrate in solution and being free from materials having a low boiling point, thereby forming a second film layer adherent to the first.

7. The method of making a fluorescent screen that comprises the mixing of a fluorescent salt with a binding composition, the binding composition comprising cellulose nitrate dissolved in amyl acetate and being free from materials having a low boiling point, forming from such a mixture a film on a supporting surface and flowing over such film while on the supporting surface a composition comprising cellulose nitrate in solution and being free from materials having a low boiling point, thereby forming a second film layer adherent to the first, and then stripping said adherent layers together from the surface.

8. A fluorescent screen having an active layer comprising a mixture of fluorescent material and a binder, the binder comprising cellulose nitrate and amyl acetate, the proportion of cellulose nitrate to the fluorescent material being not over five per cent by weight.

9. A fluorescent screen having an active layer comprising a mixture of fluorescent material and a binder, the binder comprising cellulose nitrate and amyl acetate the proportion of cellulose nitrate to the fluorescent material being substantially three per cent by weight.

10. A fluorescent screen having an active layer and a supporting layer, the active layer comprising a mixture of fluorescent material and a binder, the binder comprising cellulose nitrate and amyl acetate, the proportion of cellulose nitrate to the fluorescent material being not over five per cent by weight, and the supporting layer comprising cellulose nitrate and amyl acetate.

Signed at Salem, Massachusetts, this 18th day of December 1922.

FRANK BALCH.